No. 634,224. Patented Oct. 3, 1899.
J. WALTON.
BROILING, ROASTING, OR TOASTING DEVICE.
(Application filed Dec. 11, 1897.)
(No Model.) 2 Sheets—Sheet 1.
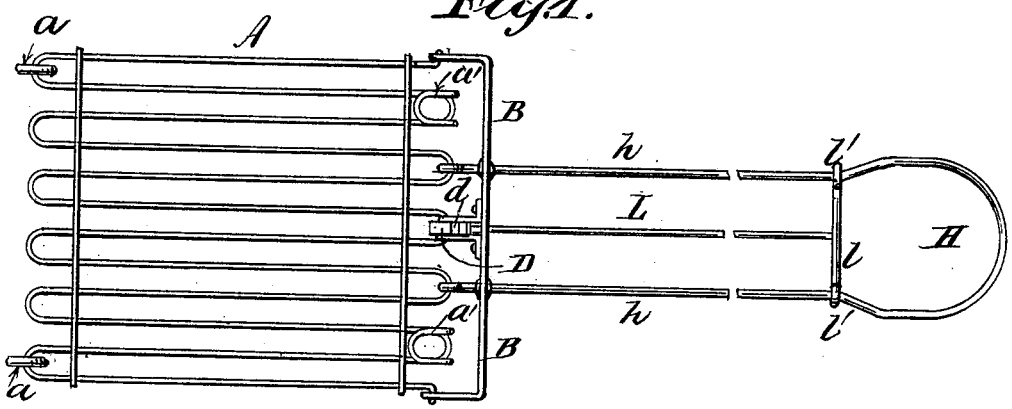
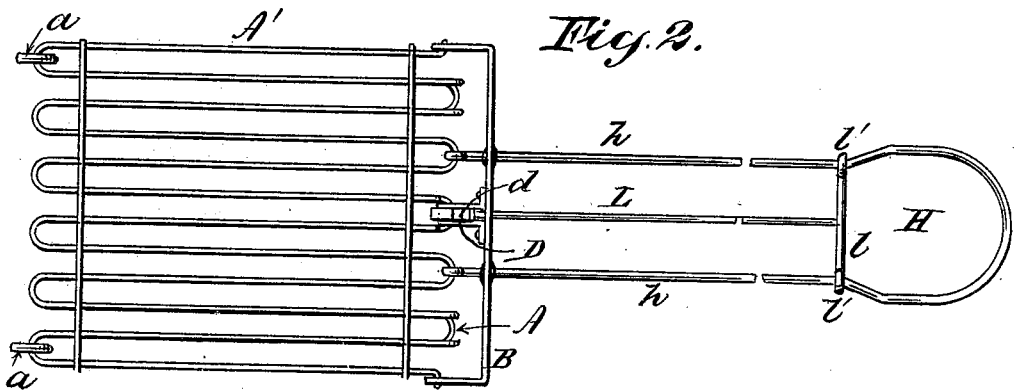
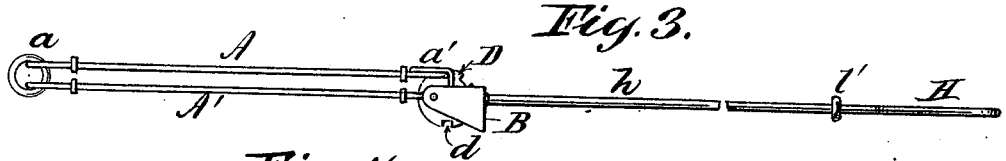
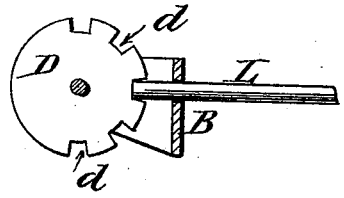
Witnesses:
D. W. Gardner
Louis N. Rowley
Inventor:
Jonathan Walton
By his Attorney
George William Miatt No. 634,224. Patented Oct. 3, 1899.
J. WALTON.
BROILING, ROASTING, OR TOASTING DEVICE.
(Application filed Dec. 11, 1897.)
(No Model.) 2 Sheets—Sheet 2.
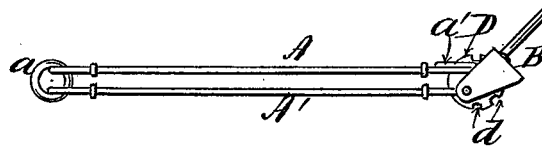
Fig. 6.
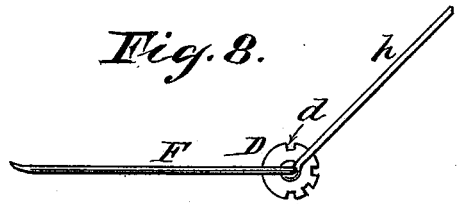
Fig. 8.
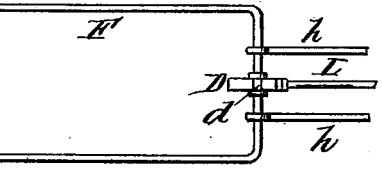
Fig. 9.
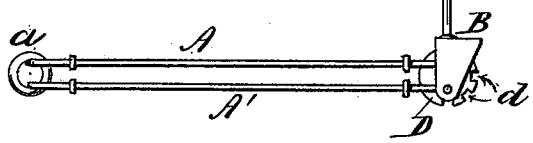
Fig. 7.
Witnesses:
D. W. Gardner.
Louis N. Rowley.
Inventor:
Jonathan Walton,
By his Attorney
George William Miatt

UNITED STATES PATENT OFFICE.

JONATHAN WALTON, OF NEW YORK, N. Y.

BROILING, ROASTING, OR TOASTING DEVICE.

SPECIFICATION forming part of Letters Patent No. 634,224, dated October 3, 1899.

Application filed December 11, 1897. Serial No. 661,522. (No model.)

*To all whom it may concern:*

Be it known that I, JONATHAN WALTON, a citizen of the United States, residing in the city of New York, (Brooklyn,) in the county of Kings and State of New York, have invented certain new and useful Improvements in Broiling, Roasting, or Toasting Devices, of which the following is a specification sufficient to enable others skilled in the art to which the invention appertains to make and use the same.

My improvements relate to the class of cooking utensils usually made, in whole or in part, of wire and used for holding and presenting articles of food before or over a fire, as in broiling or roasting meat, toasting bread, &c.

My invention consists in the special construction and arrangement of parts hereinafter described and claimed.

In the accompanying drawings I have shown my invention as adapted to a toasting-cage, although a fork or other food-holding device may be substituted for the cage without departing from the sprit and intent of my invention.

Figures 1 and 2 are elevations of opposite sides of a toasting-cage and adjustable holder; Fig. 3, an edge view of the same; Fig. 4, a detail, upon an enlarged scale, of the locking-disk and inner end of the bolt; Fig. 5, a detail of the overlapping edges of the sides of the cage. Figs. 6 and 7 are edge views of the device with the handle set at different angles to the cage. Figs. 8 and 9 are views illustrating a modification of the device in which a fork is substituted for the cage.

A represents the grating, to which the locking-disk D is secured and to which the swinging grating is attached by links $a\ a$ in such manner that the two grates may be readily opened or closed, as in ordinary devices of this character, the hooks $a'\ a'$ on the grate A engaging with projecting ends of the grate A' to secure the grates with the food to be cooked between them.

Attached to the grate A is the cross head or bars B, pivotally connected at either end in line with the center of the locking-disk D.
To this cross-head B are secured the inner ends of the handle-bars $h\ h$, preferably made of wire. These inner ends of the bars $h\ h$ preferably extend through the cross-head and encircle the opposed loops of the wire grating, as shown, for the purpose of attaining a maximum of strength and stability; although this is not essential, the cross-bar B preserving the alinement of the parts.

The inner end of the lock-bar or bolt L passes through the cross-head B and engages with any of a series of radial notches $d\ d$, formed in the periphery of the locking-disk D. The outer end of the lock-bar L is formed with a cross-bar $l$, having loops $l'\ l'$, which encircle the handle-bars $h\ h$, which latter may be made of one piece of metal or otherwise united in such manner as to afford a degree of elasticity or resilience which tends constantly to separate the said handle-bars $h\ h$. Thus by enlarging the space between the rods, so as to form the loop H, the elasticity of the metal will act upon the looped ends $l'\ l'$ of the cross-bar $l$ to force the bolt or lock-bar L inward into engagement with the notches $d\ d$ in the locking-disk D and to maintain its engagement therewith when effected.

Cheek pieces or brackets may be arranged on either side of the disk D, extending from the cross-head B and secured thereto to still further stiffen the device and hold the disk in proper relation to the bolt L.

It is obvious that in lieu of the solid locking-disk shown any equivalent arrangement of ratchet or spur wheel may be employed with like result. It is also obvious that the bolt-rod L or latch may be forced inward by a coil-spring or other elastic device, if preferred, the arrangement shown being the embodiment of my invention in a comparatively simple and cheap form of construction adapted for toasters, &c., for domestic use.

The number and proximity of the notches $d\ d$ may be varied as desired to afford any degree of angular adjustment between cage and handle.

In lieu of the cage for holding the food a fork F or equivalent device may be attached to the locking-disk D, as indicated diagrammatically in Figs. 8 and 9, in which case the result is substantially the same.

It will be seen that the locking device is concentric, with notches above and below the medial line, so that both sides of the cage or fork may be adjusted and manipulated in like manner.

What I claim as my invention, and desire to secure by Letters Patent, is—

The combination of the food-holder formed with the concentric locking device D, having notches $d$, $d$, and the handle-bars $h$, $h$, loop H, and lock-lever L, having the cross-bar $l$, engaging with the handle-bars $h$, $h$, substantially in the manner and for the purpose described.

JONATHAN WALTON.

Witnesses:
D. W. GARDNER,
GEO. WM. MIATT.